United States Patent [19]

Thomas

[11] 4,341,126

[45] Jul. 27, 1982

[54] VARIABLE AMPLITUDE VIBRATORY APPARATUS

[76] Inventor: Hubert E. Thomas, 1406 El Camino Real, Euless, Tex. 76039

[21] Appl. No.: 68,343

[22] Filed: Aug. 21, 1979

Related U.S. Application Data

[63] Continuation of Ser. No. 772,137, Feb. 25, 1977, abandoned, which is a continuation-in-part of Ser. No. 712,395, Aug. 6, 1976, abandoned.

[51] Int. Cl.³ .......... F16H 33/00

[52] U.S. Cl. .......... 74/61; 74/573 R; 209/367

[58] Field of Search .......... 74/61, 87, 573 R; 198/770; 209/366.5, 367; 173/49; 404/117; 366/123, 128; 73/535, 546, 550

[56] References Cited

U.S. PATENT DOCUMENTS

| | | | |
|---|---|---|---|
| 642,340 | 1/1900 | Lawrie | 73/546 |
| 948,047 | 2/1910 | Fraser | 74/87 |
| 952,565 | 3/1910 | Fraser | 74/87 |
| 1,128,729 | 2/1915 | Shank | 209/366.5 |
| 1,188,903 | 6/1916 | Cornwall | 209/366.5 |
| 1,207,847 | 12/1916 | Brantingham | 74/87 |
| 2,053,895 | 9/1936 | Burmeister | 209/326 |
| 2,063,509 | 12/1936 | Lacy | 209/367 |
| 2,085,774 | 7/1937 | Symons | 74/61 |
| 2,286,770 | 6/1942 | Symons | 209/367 |
| 2,475,178 | 7/1949 | Church | 73/546 |
| 2,481,174 | 9/1949 | Strawn | 74/87 |
| 2,687,718 | 8/1954 | Britton et al. | 74/87 |
| 2,779,582 | 1/1957 | Hopper et al. | 73/546 |
| 2,861,458 | 11/1958 | Awedissjan | 74/87 |
| 2,914,176 | 11/1959 | Norvell | 74/87 |
| 2,964,186 | 12/1960 | Ferrara | 209/366 |
| 2,989,869 | 6/1961 | Hanggi | 74/61 |
| 3,145,631 | 8/1964 | Green | 404/117 |
| 3,532,082 | 10/1970 | Clouse | 123/140 |
| 3,600,956 | 8/1971 | Boguth | 74/61 |
| 3,606,796 | 9/1971 | Pappers | 404/117 |
| 3,616,730 | 11/1971 | Boone et al. | 404/117 |
| 3,822,604 | 7/1974 | Grimmer | 366/128 |
| 4,034,614 | 7/1977 | Fors et al. | 74/61 |

FOREIGN PATENT DOCUMENTS

| | | | |
|---|---|---|---|
| 187489 | 1/1956 | Austria | 209/366.5 |
| 385061 | 4/1908 | France | 128/36 |

*Primary Examiner*—Lawrence J. Staab

*Attorney, Agent, or Firm*—Richards, Harris & Medlock

[57] ABSTRACT

A vibratory apparatus comprises a shaft mounted for rotation about an axis and having weight structure mounted thereon to effect vibration in response to shaft rotation. The shaft may be initially balanced or unbalanced. According to a first series of embodiments, secondary movable weight structure is mounted on the shaft for outward movement against spring action when the rotational shaft velocity reaches a predetermined magnitude to reduce vibration caused by the primary weight structure. In another embodiment, combined weight/spring structure is utilized for the same purpose. Various other types of springs may be used. In this manner the vibrational amplitude of the apparatus is caused to vary as a function of the rotational velocity of the shaft.

2 Claims, 28 Drawing Figures

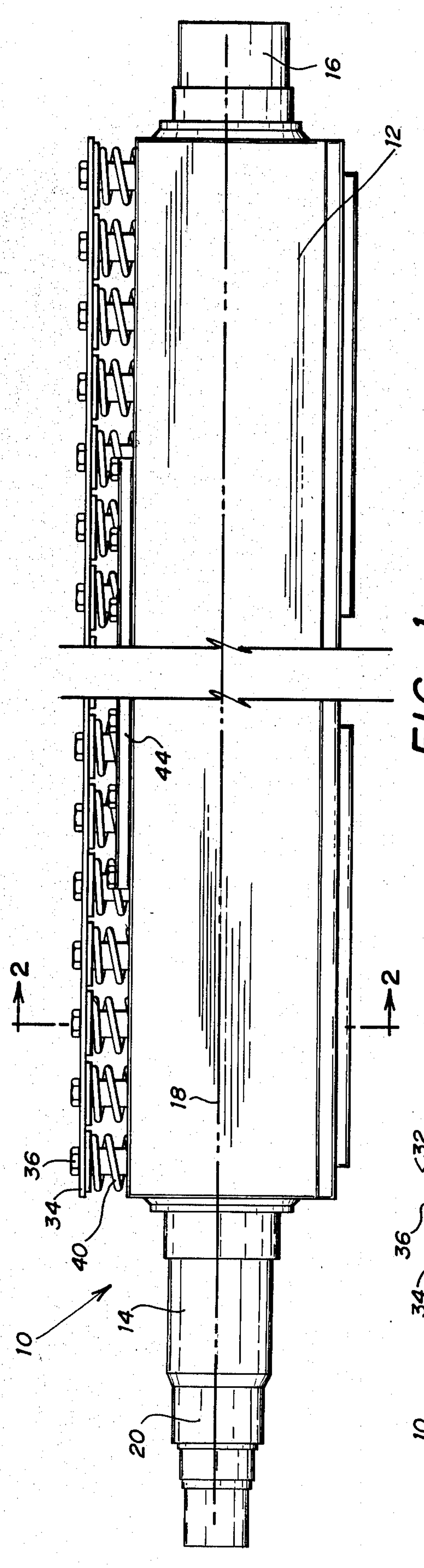
FIG. 1
| RPM | TOTAL DEFLECTION | AMPLITUDE | FORCE (lbs) |
|---|---|---|---|
| 1600 | .105" | .053" | 38,000 |
| 1800 | .090" | .045" | 36,000 |
| 1900 | .080" | .040" | 33,800 |
| 2000 | .075" | .038" | 31,800 |
| 2100 | .070" | .035" | 29,750 |
| 2200 | .060" | .030" | 27,800 |
| 2300 | .045" | .023" | 25,800 |
| 2400 | .040" | .020" | 23,900 |
| 2500 | .030" | .015" | 22,000 |
FIG. 3
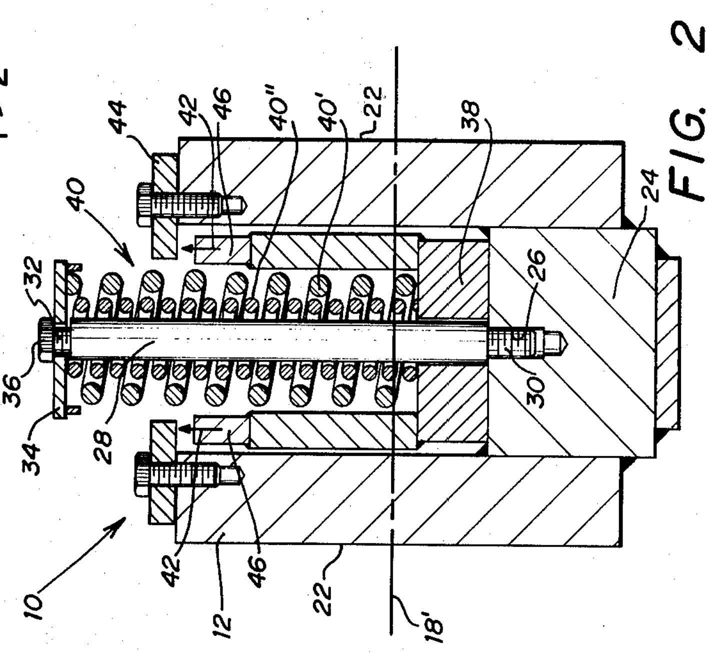
FIG. 2

VARIABLE AMPLITUDE VIBRATORY APPARATUS

CROSS REFERENCE TO RELATED APPLICATION

This is a continuation of application Ser. No. 772,137 filed Feb. 25, 1977, now abandoned, which was a continuation-in-part of application Ser. No. 712,395, filed Aug. 6, 1976, abandoned.

BACKGROUND AND SUMMARY OF THE INVENTION

This invention relates to variable amplitude vibratory apparatus, and more particularly to rotational type vibration generating mechanism wherein the vibrational amplitude is a function of rotational velocity.

At the present time, various vibrational devices are in commercial use. These include conveyors, shaker screens, pile drivers, pavement breakers, asphalt finishers, cement spreaders, concrete vibrators, grain crushers, and similar mechanisms. One particular type of vibratory device is a vibratory roller/compactor wherein vibration is utilized in addition to the usual rolling action to effect compaction of the underlying material. In many instances it is considered desirable to vary the vibrational amplitude of such apparatus in order to increase versatility and thereby render the apparatus more useful. For example, in the case of a vibratory roller/compactor it is considered desirable to maintain a large vibrational amplitude when the device is operating at lower vibrational speeds in order to compact coarse materials in deep lifts, and to reduce the vibrational amplitude when the device is operating at higher (rotating) vibrational speeds and working in thin lifts on finely graded material such as asphalt so as not to crush and destroy the material being compacted.

Heretofore changes in vibrational amplitude have typically comprised dual amplitude or multiple amplitude devices. That is, such devices have been capable of vibrating at two or more specific amplitudes, but have not been capable of operating over an infinitely variable range of amplitudes. Thus, a need exists for a variable amplitude vibratory apparatus wherein the vibrational amplitude can be varied over a range, and wherein the vibrational amplitude can be selected to provide the most efficient operation.

Other variable amplitude devices have been developed and are in use in vibratory/roller compactors. However, these devices require elaborate control systems for the transfer of fluids and gases and the restriction of speeds through elaborate electrical controls when the fluid displacement is at a maximum. Thus, the need exists for a variable amplitude vibratory apparatus that does not require special controls or liquid or gas connections to the inside of the drum, and that does not require elaborate electrical controls to limit the vibrational speed.

The present invention comprises a variable amplitude vibratory apparatus which overcomes the foregoing and other disadvantages long since associated with the prior art. In accordance with the broader aspects of the invention, a shaft is mounted for rotation about an axis. The shaft is eccentrically weighted so as to effect vibration upon rotation. Additional weight structure is mounted on the shaft for movement radially outwardly against spring action in response to a centrifugal force caused by rotation of the shaft. At a predetermined rotational velocity the force on the weight overcomes the holding power of the spring. Because of this movement the balance of the shaft is changed, and the vibrational amplitude of the apparatus therefore varies as a function of the rotational velocity of the shaft. The amplitude of the apparatus is simply controlled within predetermined limits by controlling the speed of the shaft.

Various embodiments of the invention are disclosed. Each embodiment can be used in any application where forced vibration performs useful work. In accordance with one embodiment, a single movable weight structure is utilized. The movable weight structure is slidably supported on rods which are secured to the shaft. The rods secure springs which are selected so as to prevent movement of the movable weight structure until the rotational velocity of the shaft reaches a predetermined magnitude. Thereafter the movable weight structure slides outwardly on the rods against the action of the springs, with the positioning of the movable weight structure on the rods being dependent on the rotational velocity of the shaft. As the movable weight structure moves outwardly the vibrational amplitude caused by shaft rotation is progressively diminished.

In accordance with a second embodiment of the invention dual movable weight structures are utilized. The shaft is initially balanced. This feature allows smoother acceleration of the shaft and is advantageous in a vibratory roller/compactor when the shaft is being slowed to a stop, so as to prevent resonance with supporting structure. The first movable weight structure is counter balanced, and is mounted for movement outwardly relative to the axis of rotation of the shaft against spring action when the rotational velocity of the shaft reaches a first predetermined magnitude. At this point the vibrational amplitude of the apparatus is maximized. The second movable weight structure is in turn adapted to begin sliding movement outwardly relative to the axis of rotation of the shaft against spring action when the rotational velocity of the shaft reaches a second, higher magnitude. Outward movement of the second movable weight structure functions to diminish vibrational amplitude as the rotational velocity of the shaft increases. The rotational velocity of the shaft may subsequently be reduced if maximum amplitude is desired and may be reduced further to rebalance the shaft before stopping.

A third embodiment of the invention utilizes leaf springs to resist outward movementof a wieght in response to shaft rotation. Dual leaf spring/weight structures may be utilized in order to provide an apparatus that is balanced at low rotational velocities, that is substantially unbalanced when the rotational velocity of the shaft reaches a first predetermined magnitude, and that is unbalanced to a lesser degree when the rotational velocity of the shaft reaches a second, higher predetermined magnitude.

A fourth embodiment of the invention utilizes torsional springs to resist outward movement of weights in response to shaft rotation. Two pairs of torsional spring/weight structures are mounted for pivotal movement about axes perpendicular to the axis of rotation of the shaft. The apparatus is balanced at low rotational shaft velocities, up to a first predetermined magnitude, but thereafter becomes progressively unbalanced as the rotational shaft velocity reaches a second, higher predetermined magnitude.

In accordance with a fifth embodiment of the invention, multiple movable weight structures are utilized so that the shaft is initially balanced. This feature allows smoother acceleration of the shaft and is also advantageous in a vibratory roller/compactor as the shaft is brought to a stop without causing resonance in the drum/frame system. The shaft remains balanced up to a first predetermined shaft rotational velocity, at which point the primary movable weight structure(s) commences outward movement relative to the axis of rotation of the shaft against spring action. At a second predetermined rotational shaft velocity, the primary movable weight structure reaches maximum outward displacement, whereby the vibrational amplitude of the apparatus is maximized. Outward movement of the secondary movable weight structure(s) functions to diminish vibrational amplitude as the rotational shaft velocity increases beyond a third predetermined magnitude. Thus, the vibrational amplitude of the apparatus may be changed by increasing or decreasing rotational velocity of the shaft.

A sixth embodiment of the invention incorporates triple movable weight structures and is initially balanced. Dual pivotal weight structures pivot outwardly from the shaft in opposition to elastomeric springs after a first predetermined rotational shaft velocity has been attained. The vibrational amplitude of the apparatus is maximized until the rotational velocity of the shaft reaches a second higher value, when outward movement of the secondary movable weight structure(s) functions to decrease vibrational amplitude as the rotational shaft velocity increases further.

In accordance with a seventh embodiment of the invention, dual movable weight structures are utilized so that the shaft is initially unbalanced. The first movable weight structure is mounted for movement outwardly relative to the axis of rotation of the shaft against stacks of elastomeric springs until the rotational shaft velocity reaches a first predetermined magnitude, which corresponds to maximum vibrational amplitude of the apparatus. The second movable weight structure in turn begins outward movement relative to the axis of rotation of the shaft against stacks of elastomeric springs when the rotational shaft velocity reaches a second predetermined magnitude. This functions to decrease vibrational amplitude of the apparatus as the rotational shaft velocity increases.

According to an eighth embodiment of the invention, dual movable weight structures are enclosed within a housing on a shaft so as to be initially balanced. Elastomeric springs are utilized to resist outward movement of the weights in response to shaft rotation. The shaft is balanced until rotational shaft velocity reaches a first predetermined value, at which point the first movable weight structure begins outward movement relative to the axis of rotation of the shaft until reaching a maximum displacement corresponding to maximum vibrational amplitude. At a second, higher predetermined shaft rotational velocity, the second movable weight structure begins outward movement which tends to counterbalance the shaft, decreasing vibrational amplitude as the rotational shaft velocity increases. After the second movable weight structure reaches maximum displacement, the vibrational amplitude stays constant in spite of further increases in rotation shaft velocity. In each of the foregoing embodiments, other spring systems, including elastomeric springs, coil springs, and disc springs, may be utilized interchangeably to resist weight movement, if desired.

The ninth embodiment of the invention features dual movable weight structures constructed of a resilient material so as to resist deflection thereof. The weight structure is enclosed within a housing mounted on a shaft which is balanced. The dual, combination spring/weight structures are responsive to rotational shaft velocity to provide an apparatus that is balanced at relatively low rotational velocity, that is substantially unbalanced when the rotational shaft velocity reaches a first predetermined magnitude, and that is unbalanced to a lesser extent when the rotational shaft velocity reaches a second, higher predetermined magnitude.

DESCRIPTION OF THE DRAWINGS

A more complete understanding of the invention may be had by reference to the following Detailed Description when taken in conjunction with the accompanying Drawings, wherein:

FIG. 1 is a side view of a variable amplitude vibratory apparatus incorporating a first embodiment of the invention in which certain parts have been broken away to more clearly illustrate certain features of the invention;

FIG. 2 is a sectional view taken generally along the line 2—2 in FIG. 1 in the direction of the arrows;

FIG. 3 is a table showing typical operating characteristics of the embodiment of the invention of FIG. 1;

DETAILED DESCRIPTION

Figure 4:
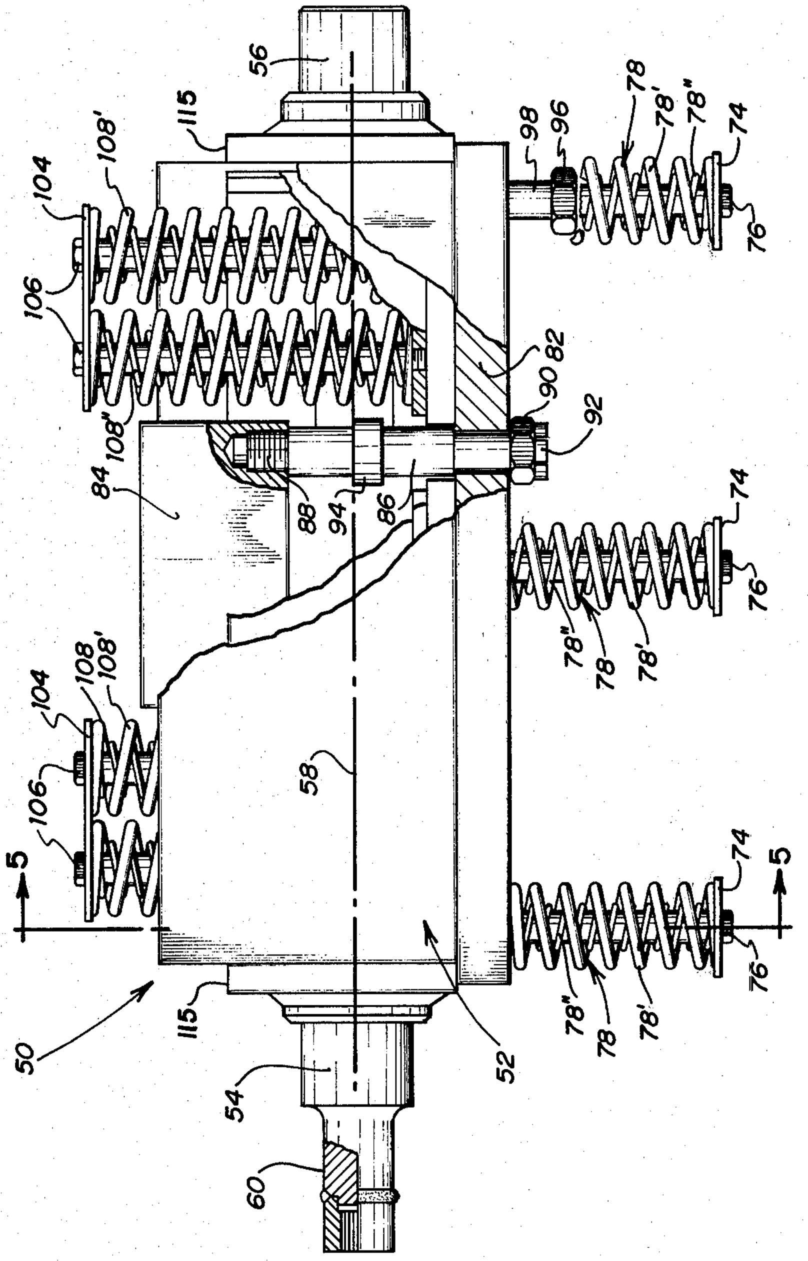
FIG. 4 is a side view of a variable amplitude vibratory apparatus incorporating a second embodiment of the invention in which certain parts have been broken away to more clearly illustrate certain features of the invention.

Referring now to the Drawings, and particularly to FIG. 1 thereof, there is shown a variable amplitude vibratory apparatus 10 incorporating a first embodiment of the invention. The apparatus 10 comprises a shaft 12 which is adapted for use in a vibratory mechanism, for example a vibratory roller/compactor. The shaft 12 has a pair of opposed bearing portions 14 and 16 which define an axis of rotation 18. The vibratory apparatus 10 is particularly useful in an application where relatively widely spaced supporting means for bearing portions 14 and 16 require a longer shaft 12. Rotation of the shaft 12 about the axis 18 is effected by means of structure 20 at the end thereof adjacent the bearing portion 14. The structure 20 may comprise an internal spline, an external spline, suitable gearing, or other convention structure.

Referring to FIG. 2 the plane 18' shown therein is coincident with the axis of rotation 18 of the shaft 12. The shaft 12 comprises a spaced pair of side plates 22. A member 24 is secured to the plates 22 by welding for cooperation therewith to define the frame of the shaft 12. The positioning of the member 24 is substantially offset from the axis of rotation 18 of the shaft 12, and thus defines an eccentrically positioned weight or mass. Thus, upon rotation of the shaft 12 the eccentric positioning of the member 24 causes vibratory of the structure incorporating the vibratory apparatus 10.

The member 24 has a plurality of drilled and tapped holes 26 formed therein. A plurality of rods 28 are each provided with a reduced and threaded end portion 30 whereby the rods are threadedly secured to the member 24. Each of the rods 28 extends through the axis of rotation 18 of the shaft 12 and radially outwardly with respect thereto to a reduced and threaded end portion 32. A spring retainer 34 is mounted on the rods 28 and is secured thereon by threaded engagement of a nut 36 with the reduced and threaded portion of each rod 28.

An elongate, generally U-shaped movable weight member 38 is slidably supported on the rod 28 of the shaft 12. The movable weight member 38 is normally retained in the position illustrated in FIG. 2 by means of a plurality of springs 40. The springs 40 are arranged in pairs, with each pair being concentric with one of the rods 28. Each pair of springs comprises a relatively large diameter spring 40' and a relatively small diameter spring 40". The springs 40 extend between the spring retainer 34 and the movable weight member 38. It will be understood that both the spring rate and the preloading of the springs 40 depends upon the desired operating characteristics of the variable amplitude vibratory mechanism 10.

The multiplicity of rods 28 and springs 40 constitutes a significant feature of this embodiment whereby the loading is distributed over a longer shaft 12 to eliminate undesireable bending and fatigue characteristics. This more uniform loading also minimizes misalignment of supporting structure for the bearing portions 14 and 16. Moreover, utilization of a plurality of springs helps maintain low individual spring stress and effectively averages variances in individual spring specifications.

In the operation of the variable amplitude vibratory apparatus 10, the movable weight member 38 is initially retained in the position illustrated in FIG. 2. As the rotational velocity of the shaft 12 is increased, the resistance of the springs 40 is eventually overcome, whereupon the movable weight member 38 begins to move outwardly on the rods 28 in the direction of the arrows 42. As the rotational velocity of the shaft 12 continues to increase, the movable weight member 38 continues to move outwardly on the rods 28 until further movement thereof is prevented by stops 44 which are secured to the upper ends of the plates 22. Additional weight members 46 may be utilized to balance the shaft 12 in the dynamic condition, if desired.

As will be readily understood by those skilled in the art, the operating characteristics of a rotational type vibratory apparatus are typically designated by means of the wr factor, the units of which are expressed in pound-inches. The unbalance of the rotating shaft in a vibrating apparatus causes movement of the entire vibrating apparatus thereby performing useful work. The shaft is forced to rotate by various means causing a centrifugal force to be developed. Thus:

$$F=0.000341\ wrn^2$$

derived from the formula $F=(wv^2/gr)$ where n=number of revolutions per minute, w=weight of the revolving body in pounds, and r=perpendicular distance from the axis of rotation to the center of mass or for practical use, to the center of gravity of the revolving body, in inches.

The "wr" factor affects the amplitude of the apparatus as well as the force. The amplitude can be calculated for a single shaft system using the following formula.

$$F=0.000341\ Wan^2$$

where

W=Total weight of all vibrating parts including w (the weight of the unbalanced shaft assembly), and a=radius of gyration of the apparatus or amplitude thus $$F=0.000341\ Wan^2=0.000341\ wrn^2$$

therefore

Wa=wr and a=wr/W w and W are constants for any given apparatus but the weight held in place by springs the value for "r" can be changed and "a" therefore changes in direct proportion. It will thus be understood that the primary advantage derived from the use of the first embodiment of the invention involves the fact that by properly selecting both the spring rates and the preloading of the springs, the system may be designed to generate a wr factor which varies with the rotational velocity of the shaft.

By way of example, a variable amplitude vibratory shaft constructed as shown in FIGS. 1 and 2 was designed to have a constant unbalance from zero RPM through 1800 RPM, and to thereafter have a declining wr factor from 1800 RPM to 2500 RPM. That is, the springs 40 were designed to retain the weight member 38 in the position shown in FIG. 2 until the rotational velocity of the shaft 12 reached 1800 RPM. Upon further increase in the rotational velocity of the shaft 12, the movable weight member 38 moved outwardly on the rods 28 and finally engaged the stops 44 when the rotational velocity of the shaft 12 reached 2500 RPM. This may be summarized as follows:

| Rotational Velocity of Shaft 12 | wr Factor |
|---|---|
| (1) Static through 1800 RPM | 378 |
| (2) at 2500 RPM | 125 |

it being understood that the wr factor is infinitely variable between the limits of 378 at rotational velocities up to 1800 RPM and 125 at rotational velocities of 2500 RPM and above.

The foregoing variable amplitude vibratory apparatus constructed in accordance with FIGS. 1 and 2 was mounted in a vibratory roller/compactor incorporating the present invention are summarized in the table comprising FIG. 3. Referring to FIG. 3, it will be seen that both the vibrational amplitude of the roller of the vibratory roller/compactor and the force applied by the roller of the vibratory roller/compactor decreased uniformly as the rotational velocity of the shaft of the variable amplitude vibratory apparatus of the vibratory roller/compactor was increased from 1800 RPM and 2500 RPM. The figures shown are from an actual test wherein a record of the total deflection or "drum bounce" was made and measured. The amplitude, which is ½ the total deflection, compares reasonably well with the amplitude as calculated by the formula a=wr/W where the total weight W=7500 pounds and wr varied from 378 to 125 pound-inches.

The forces in FIG. 3 were calculated from the formula set out above using the known calculated values for wr, 378 at 1600 RPM and 125 at 2500 RPM. The force figures between these RPM were interpolated using a straight line method.

Referring now to FIG. 4, there is shown a variable amplitude vibratory apparatus 50 comprising a second embodiment of the invention. The apparatus 50 comprises a shaft 52 having opposed bearing portions 54 and 56. The bearing portions 54 and 56 support the shaft 52 for rotation about an axis 58. Rotation of the shaft 52 is effected by means of structure 60 extending from the end thereof adjacent the bearing portion 54. The structure 60 may comprise an internal spline as shown, an external spline, suitable gearing, or other conventional structure.

Figure 5:
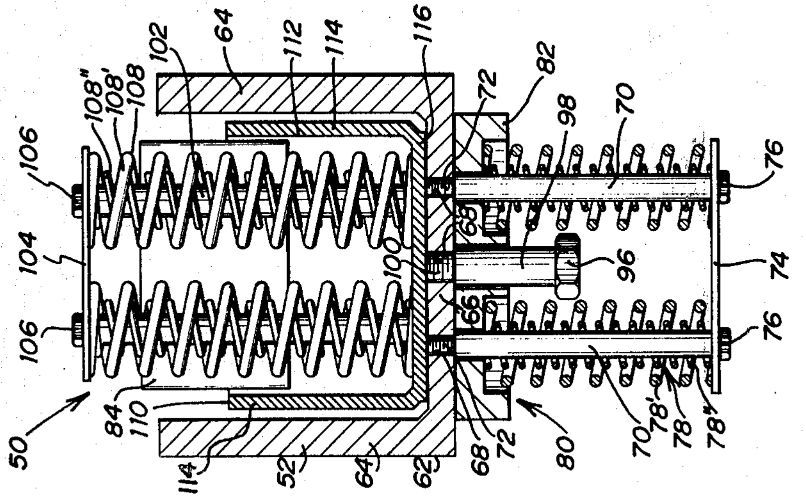
FIG. 5 is a sectional view taken generally along the lines 5—5 in FIG. 4 in the direction of the arrows.

Referring to FIG. 5, the shaft 52 comprises a generally U-shaped frame member 62. The frame member 62 comprises a pair of side plates 64 and a base member 66. The base member 66 has a plurality of drilled and tapped holes 68 formed therein (not all of which are shown).

A plurality of rods 70 are each provided with a reduced and threaded end portion 72. By this means the rods 70 are each threadedly secured to the base 66 of the U-shaped frame 62. The rods are symmetrically disposed about the axis of rotation 58 of the shaft 52, and each pair of rods 70 extends radially outwardly therefrom. The ends of the rods 70 remote from the reduced and threaded portions 72 are similarly reduced and threaded, and spring retainers 74 are secured thereon by means of nuts 76.

A plurality of springs 78 are arranged in pairs, with each pair being concentric with one of the rods 70. Each pair of springs 78 comprises a relatively large diameter spring 78' and a relatively small diameter spring 78''. The springs 78 are each mounted between one of the spring retainers 74 and a first movable weight assembly 80. The first movable weight assembly 80 comprises a first member 82 having the rods 70 extending therethrough. The first member 82 is mounted for sliding movement relative to the rods 70. The first movable weight assembly 80 further comprises a second member 84 which is secured to the first member 82 for movement therewith.

Referring momentarily to FIG. 4, the first and second members 82 and 84 comprising the first movable weight assembly 80 are interconnected by means of a plurality of rods 86. Both ends of each rod 86 are threaded, and one end of each rod 86 is threadedly engaged with the second weight member 84 at 88. The oppsite end of each rod 86 receives a nut 90 and a jam nut 92, whereby the members 82 and 84 are secured one to the other.

The first movable weight assembly 80 is mounted for sliding movement along the rods 70 against the action of the springs 78. Such movement of the first movable weight assembly 80 is limited by a plurality of stops 94 mounted on the rods 86 and adapted for engagement with the base member 66 of the U-shaped frame 62. Referring again to FIG. 5, movement of the first movable weight assembly 80 is further limited by a plurality of stops 96 mounted at the distal ends of the rods 98 having reduced and threaded end portions 100, whereby the rods 98 are threadedly secured to the base member 66 of the U-shaped frame 62.

A plurality of rods 102 are each similar to the rods 70. Each rod 102 has a reduced and threaded end (not shown) which threadedly engages one of the apertures 68 formed in the base member 66 of the frame 62. The opposite ends of the rods 102 are reduced and threaded, and spring retainers 104 are received thereon. The spring retainers 104 are secured by nuts 106 which threadedly engage the reduced and threaded distal ends of the rods 102.

A plurality of springs 108 are arranged in pairs, with each pair being concentric with one of the rods 102. Each pair of springs 108 comprises a relatively large diameter spring 108' and a relatively small diameter spring 108". Springs 108 are each mounted between one of the spring retainers 104 and a second movable weight assembly 110.

The second movable weight assembly 110 comprises an open box type member 112 including a pair of side plates 114, a pair of end plates 115 and a base 116. The base 116 of the second movable weight assembly 110 is normally retained in engagement with the bass 66 of the U-shaped frame 62 by means of the springs 108. The side plates 114 of the second movable weight assembly 110 extend between the side plates 64 of the frame 62 and the outside surface of the second portion 84 of the first movable weight assembly 80.

The operation of the variable amplitude vibratory apparatus 50 is as follows. The shaft 52 is initially balanced, and the wr factor of the apparatus is therefore initially substantially zero. This is highly advantageous in that the amplitude remains substantailly zero relative to and in direct proportion to the wr factor. In a vibratory roller/compactor when the shaft speed is slowed and passes through the range of speeds between about 1000–800 RPM, resonant frequency in the frame-drum system develops causing undesirable bouncing. The balanced shaft of the present invention eliminates this problem. This is extremely valuable in compacting asphalt surfaces where a more smooth end result is a necessity.

When the rotational velocity of the shaft 52 reaches a first predetermined magnitude, the first movable weight assembly 80 moves outwardly along the rods 70 until the stops 94 and 96 are engaged. At this point the wr factor of the variable amplitude vibrational apparatus 50 is maximized. This operational condition of the apparatus 50 continues until the rotational velocity of the shaft 52 reaches a second predetermined magnitude. As the rotational velocity of the shaft 52 increases beyond the second predetermined magnitude the second movable weight assembly 110 moves outwardly on the rods 102 thereby decreasing the wr factor of the variable amplitude vibratory apparatus 50. Further outward movement of the second movable weight assembly 110 is finally limited by engagement thereof with the second portion 84 of the first movable weight assembly 80, whereupon the wr factor of the variable amplitude vibratory apparatus 50 has been substantially reduced.

By way of example, a variable amplitude vibratory apparatus of the type illustrated in FIGS. 4 and 5 was designed to have a wr factor of substantially zero from zero RPM through approximately 1200 RPM. As the rotational speed of the shaft increased beyond 1200 RPM the first movable weight assembly of the device moved outwardly, and thereupon established a maximum wr factor of 135. This wr factor was substantially constant until the rotational velocity of the shaft reached approximately 2000 RPM. At that point the second movable weight assembly began to move outwardly whereby the wr factor of the apparatus was gradually reduced. At approximately 3000 RPM the second movable weight assembly reached the outer limit of its movement, whereupon the wr factor of the apparatus was reduced to approximately 45.

Figure 6:
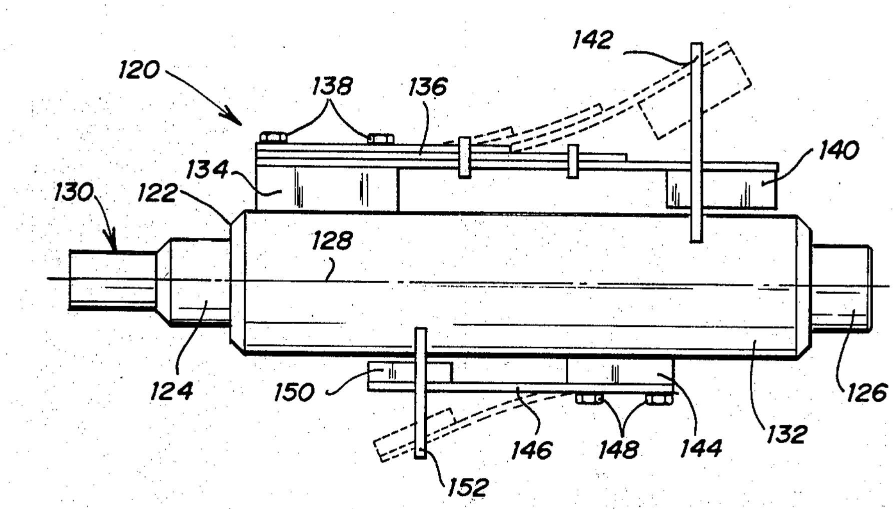
FIG. 6 is a side view of a variable amplitude vibratory apparatus incorporating a third embodiment of the invention.
Figure 7:
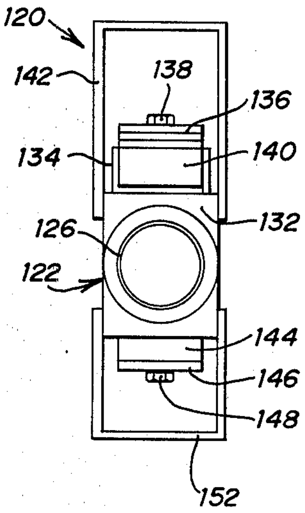
FIG. 7 is an end view of the embodiment of the invention illustrated in FIG. 6.

Referring to FIGS. 6 and 7, there is shown a variable amplitude vibratory apparatus 120 incorporating a third embodiment of the invention. The apparatus 120 comprises a shaft 122 which is adapted for use in a vibratory mechanism, for example a vibratory roller/compactor. The shaft 122 has a pair of opposed bearing portions 124 and 126 which define an axis of rotation 128. Rotation of the shaft 122 about the axis 128 is effected by means of structure 130 at the end thereof adjacent the bearing portion 124. The structure 130 may comprise an internal spline as shown, an external spline, suitable gearings, or other conventional structure.

The shaft 122 comprises a central portion 132 which is symmetrical about the axis 128. A block 134 is secured on the portion 132, and a leaf spring 136 is mounted on the block 134. The leaf spring 136 is retained by means of fasteners 138. A weight 140 is mounted at the distal end of the leaf spring 136, and is retained thereon by suitable means as conventional fasteners or welding.

The leaf spring 136 retains the weight 140 in the position illustrated in full lines in FIG. 6 until the rotational velocity of the shaft 122 exceeds a first predetermined magnitude. As the rotational velocity of the shaft 122 is further increased, the weight 140 moves outwardly against the action of the spring 136. A yoke 142 is provided for limiting the outward movement of the weight 140 as the rotational velocity of the shaft 122 further increases.

A block 144 is mounted on the shaft 122. A leaf spring 146 is secured to the block 144 by fasteners 148, and in turn supports a weight 150. The leaf spring 146 retains the weight 150 in the position illustrated in full lines in FIG. 6 until the rotational velocity of the shaft 122 exceeds a second, higher predetermined magnitude. Thereafter, as the rotational velocity of the shaft 122 is further increased the weight 150 moves outwardly against the action of the leaf spring 146. A yoke 152 is provided for limiting outward movement of the weight 150 as the rotational velocity of the shaft 122 is further increased.

As is most clearly shown in FIG. 7, the weight 140 and 150 are both supported for outward movement in a plane extending through the axis 128. It will thus be understood that the shaft 122 is initially balanced, and that the wr factor of the shaft is therefore substantially zero until the first predetermined rotational velocity of the shaft 122 is reached. The weight 140 thereupon moves outwardly to the position shown in dashed lines in FIG. 6, whereby the wr factor of the shaft 122 is maximized. As the rotational velocity of the shaft 122 is increased through the second predetermined magnitude, the weight 150 moves outwardly to the position shown in dashed lines in FIG. 6. The weight 150 tends to counter balance the weight 140, whereby the wr factor of the shaft 122 is substantially reduced.

Figure 8:
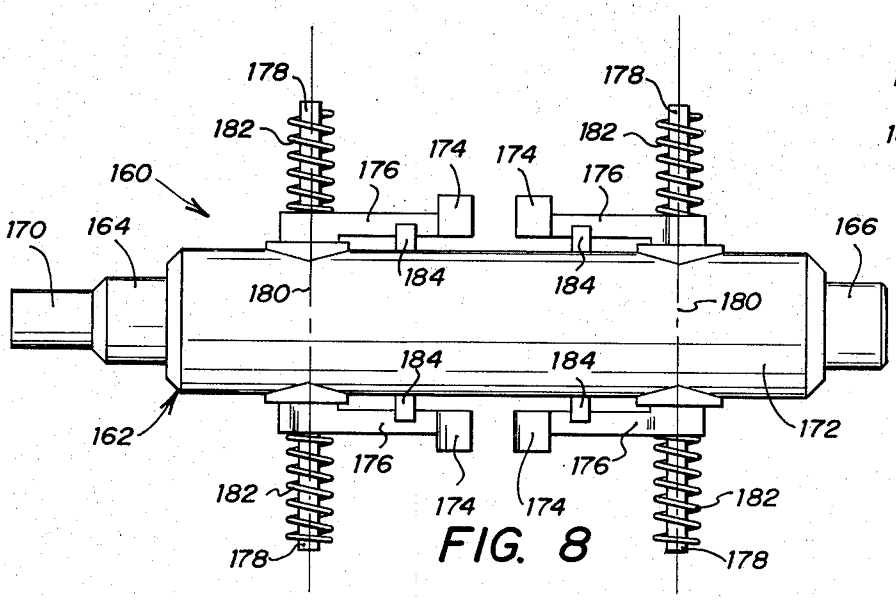
FIG. 8 is a top view of a variable amplitude vibratory apparatus incorporating a fourth embodiment of the invention.
Figure 9:
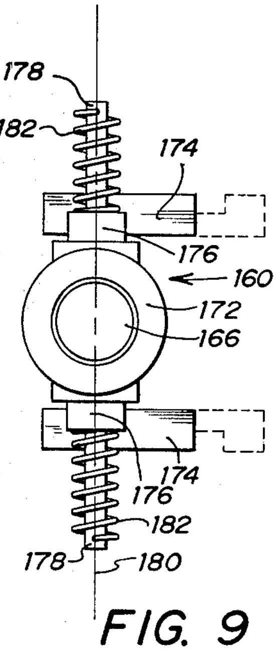
FIG. 9 is an end view of the embodiment of the invention shown in FIG. 8.
Figure 10:
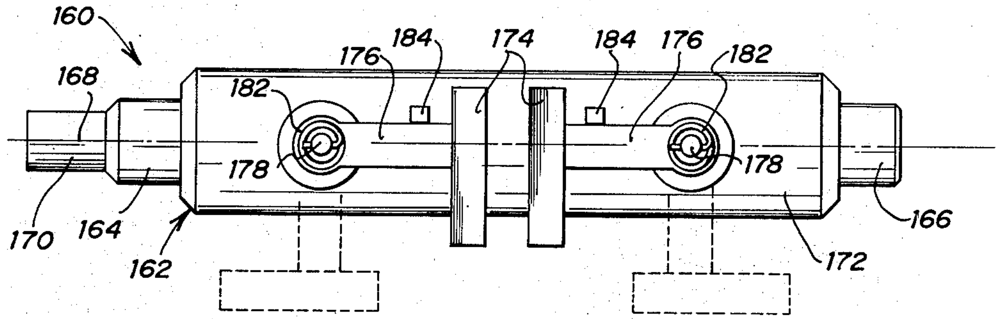
FIG. 10 is a side view of the embodiment of the invention shown in FIG. 8.

A fourth embodiment of the invention is illustrated in FIGS. 8, 9 and 10. A variable amplitude vibratory apparatus 160 comprises a shaft 162 which is adapted for use in a vibratory mechanism, for example a vibratory roller/compactor. The shaft 162 has a pair of opposed bearing portions 164 and 166 which define an axis of rotation 168. Rotation of the shaft 162 about the axis 168 is effected by means of structure 170 at the end thereof adjacent the bearing portion 164. The structure 170 may comprise an internal spline, an external spline, suitable gearing, or other conventional structure. The shaft 162 comprises a central portion 172 having a plurality of weights 174 supported thereon by means of arms 176. The arms 176 are pivotally supported on rods 178 for rotational movement about axes 180. A plurality of torsional springs 182 are also mounted on rods 178, and function to normally retain the arms 176 in engagement with stops 184.

The arms 176 remain in engagement with the stops 184 until the rotational velocity of the shaft 162 exceeds a predetermined magnitude. Thereafter as the rotational velocity of the shaft 162 is further increased the weights 174 move away from the positions shown in full lines in FIGS. 9 and 10 towards the position shown in dashed lines therein, against the action of the torsional springs 182. It will thus be understood that the wr factor of the shaft 162 is caused to vary in accordance with the rotational velocity thereof.

Figure 11:
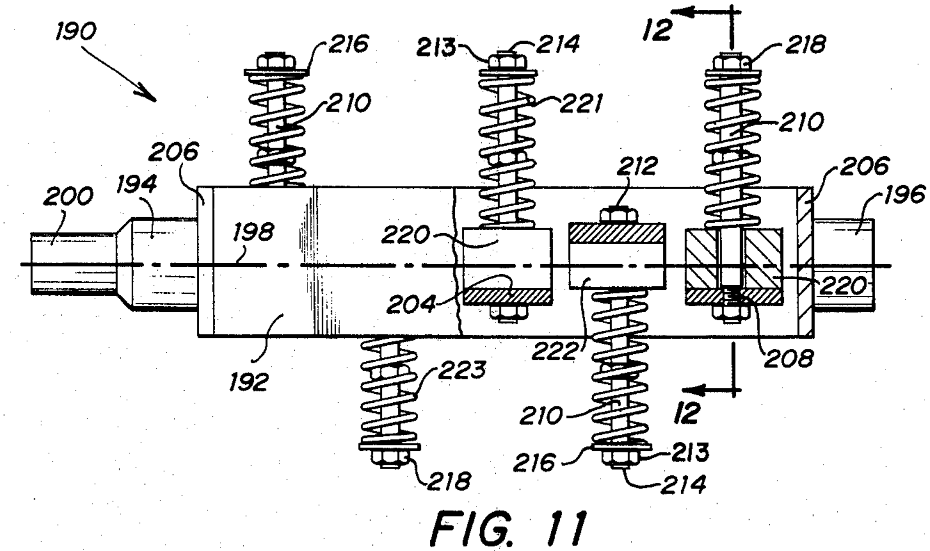
FIG. 11 is a side view of a variable amplitude vibratory apparatus incorporating a fifth embodiment of the invention in which certain parts have been broken away to more clearly illustrate certain features of the invention.
Figure 12:
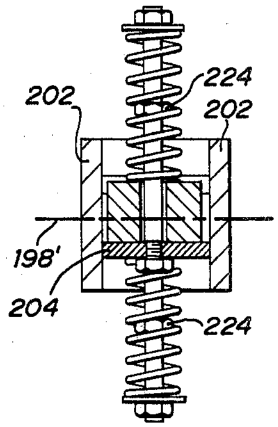
FIG. 12 is a sectional view taken generally along the line 12—12 of FIG. 11 in the direction of the arrows.

Referring to FIGS. 11 and 12, there is shown a variable amplitude vibratory apparatus 190 incorporating a fifth embodiment of the invention. The apparatus 190 comprises a shaft 192 for use in a vibratory mechanism, such as a vibratory roller/compactor. The shaft 192 has a pair of opposed bearing portions 194 and 196 which define an axis of rotation 198. Rotation of the shaft 192 about the axis 198 is effected by means of structure 200 at the end thereof adjacent to bearing portion 194. The structure 200 may comprise an internal spline, and external spline, suitable gearing, or other conventional structure.

Referring to FIG. 12, the plane 198' shown therein is coincident with the axis of rotation 198 of the shaft 192. Shaft 192 comprises a spaced pair of side plates 202 which may be but are not necessarily symmetrical about the plane 198'. Cross members 204 are secured by welding between side plates 202 at spaced longitudinal locations therealong. Together with end plates 206, which are secured to side plates 202 as shown in FIG. 11, cross members 204 and side plates 202 cooperate to define the frame of shaft 192.

Each cross member 204 is offset from the axis of rotation 198 of shaft 192, and has a drilled and tapped hole 208 formed therein. Each rod 210 is provided with a reduced and threaded end portion 212 by which one rod 210 is threadedly secured to each cross member 204. Nuts 213 further secure rods 210 to cross members 204. Each of the rods 210 extends through the axis of rotation 198 of the shaft 192 and radially outwardly with respect thereto to a reduced and threaded end portion 214. Spring retainers 216 are mounted on the rods 210 and secured thereon by threaded engagement of nuts 218 with the reduced and threaded portions of each rod 210.

A movable weight member 220 or 222 is slidably supported on an alternate rod 210 of the shaft 192. Primary weight members 220 are normally retained slightly offset from axis 198 in the positions illustrated in FIG. 11 by means of springs 221. Secondary weight members 222 are normally retained by springs 223 in the positions illustrated in FIG. 11 and slightly offset from axis 198. Each spring 221 or 223 is concentric with a rod 210, and extends between the spring retainer 216 and the movable weight member 220 or 222. It will be understood that the spring rate, the mass of weight members 220 and 222, and the preloading of springs 221 and 223 depend upon the desired operating characteristics of the variable amplitude vibratory apparatus 190. It will also be understood that a plurality of weight member 220 and 222, and rods 210 may be associated with each cross member 204, if desired.

In the operation of the variable amplitude vibratory apparatus 190, movable weight members 220 and 222 are initially retained in the positions shown in FIG. 11, until the rotational velocity of shaft 192 reaches a first predetermined magnitude. At first predetermined magnitude, springs 221 become ineffective to retain primary weights 220, which gradually begin outward movement along rods 210. As the rotatinal velocity of shaft 192 increases, primary weight members 220 continue to move outwardly on rods 210 until engagement with stops 224 which are secured to rods 210. Thus, the amplitude of the vibratory apparatus 190 is controlled merely by varying the rotational shaft velocity within a first predetermined range. Constant maximum amplitude is maintained between the second predetermined rotational shaft velocity and a third higher predetermined value. As the rotational shaft velocity is increased beyond the third predetermined value, springs 223 are ineffective to resist outward movement of secondary weights 222, which begin to move outwardly along rods 210. As the rotational velocity of shaft 192 continues to increase, secondary weights 222 progress outwardly on rods 210 thus tending to counterbalance primary weights 220, until further movement thereof is prevented by stops 224. Accordingly, the amplitude of vibratory apparatus 190 is decreased as rotational shaft velocity is increased beyond the third determined magnitude.

It will be understood that the number of movable weight members 220 and 222 and the length of shaft 192 can vary over a wide range. However, in vibratory apparatus 190, a combined total of at least three movable weight members 220 and 222 are required to achieve balanced loading at the bearing portions 194 and 196.

Vibratory apparatus 190 may be set to produce specific amplitudes between wide ranges of rotational shaft velocity, instead of infinite amplitude adjustment between relatively narrower ranges of rotational shaft velocity. This is obtained by varying the spring rates of spring 221 and 223. For example, assume that springs 223 having a relatively low spring rate were used with secondary weights 222, that a spring 221 having a relatively higher spring rate were used to retain middle primary weight 220, and that springs 221 having an even higher relative spring rate were used with end primary weights 220. With this arrangement, as rotational shaft velocity is increased there is a first RPM range in which springs 221 and 223 are effective to retain weights 220 and 222, whereby the amplitude of vibratory apparatus 190 is zero. Following consecutively are three ranges of rotational shaft velocity corresponding to amplitudes produced by: the outward displacement of secondary weights 222, the outward displacement of secondary weights 222 as counterbalanced by the outward displacement of middle primary weight 220, and the outward displacement of secondary weights 222 and middle primary weight 220 as counterbalanced by the outward displacement of end primary weights 220. By utilizing more movable weights 220 and 222, and springs 221 and 223 of differing spring rates, it will be apparent that even more ranges of preselected amplitude are possible. As was previously described, maximum amplitude is varied by adjusting stops 224 and/or changing weights 220 and 222.

By way of example, a variable amplitude vibratory apparatus was constructed in accordance with FIGS. 11 and 12 and operated experimentally. Recordation of the operating characteristics indicated the following. Since the shaft was initially balanced, there was zero amplitude from 0 up to 1200 RPM. Between 300 RPM and 1800 RPM, an amplitude of 0.060 inch was maintained. An amplitude of 0.045 inch was produced between 1900 RPM and 2200 RPM. The final range of 2300 RPM to 2800 RPM yielded four specific amplitude records from 0.045 inch through 0.015 inch in successive steps for each 100 RPM increase in shaft speed. Consequently, the vibratory apparatus 190 may be adjusted to produce specific amplitudes between relatively wide ranges of rotational shaft velocity, or to produce desired amplitude changes between relatively narrow ranges of rotational shaft velocity, depending upon the selection of springs, spring rates, stop positions, size of weight members, and number of weight members.

Figure 13:
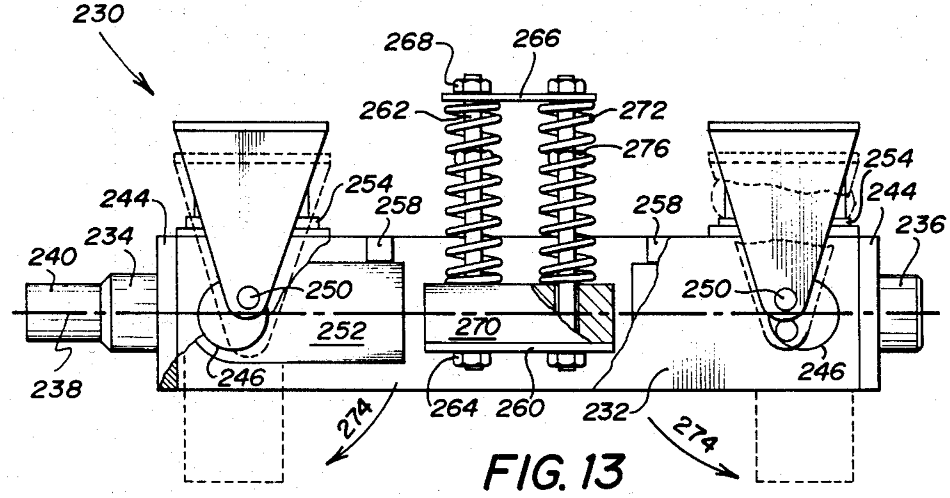
FIG. 13 is a side view of a variable amplitude vibratory apparatus incorporating a sixth embodiment of the invention in which certain parts have been broken away to more clearly illustrate certain features of the invention.
Figure 14:
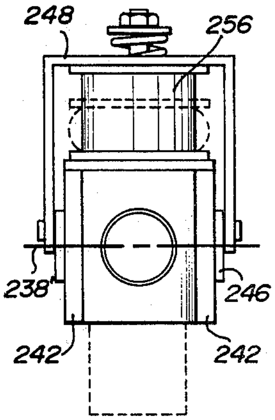
FIG. 14 is an end view of the embodiment of the invention illustrated in FIG. 13.

A sixth embodiment of the invention is illustrated in FIGS. 13 and 14. A variable amplitude vibratory apparatus 230 comprises a shaft 232 which may be used in a vibratory mechanism, such as a vibratory roller/compactor. The shaft 232 has a pair of opposed bearing portions 234 and 236 which define an axis of rotation 238. Rotation of shaft 232 is effected by means of structure 240 at the end thereof adjacent the bearing portion 234. The structure 240 may comprise an internal spline, and an external spline, suitable gearing or other conventional structure.

In reference to FIG. 14, plane 238′ shown therein is coincident with the axis of rotation 238 of shaft 232. Shaft 232 comprises a spaced pair of side plates 242 secured to end plates 244. End plates 244 in conjunction with side plates 242 define the frame of shaft 232.

Pivot shafts 246 are located at both ends of frame 232 and are mounted for pivotal movement in side plates 242. The axis of rotation of each pivot shaft 246 may be, but is not necessarily coincident with plane 238′. To the outside of shaft 232, a yoke 248 is pivotally attached to each shaft 246 at point 250, which is offset from the rotational axis of shaft 246. To the inside of the frame of shaft 232, a primary movable weight 252 is mounted on each pivot shaft 246. Plates 254 are secured across the top edges of side plates 242 beneath yokes 248 and serve as base mountings for the elastomeric springs 256. Positioned between yokes 248 and plates 254 are elastomeric springs 256 which are preloaded and function through yokes 248 to generate a moment about the axis of each shaft 246 which forces primary weights 252 against stops 258 as shown in full lines in FIG. 13.

Cross member 260 is welded between side members 242 and is offset from plane 238′. Cross member 260 includes two drilled and tapped holes which receive reduced and threaded end portions of rods 262. Nuts 264 threadedly engage the reduced and threaded end portions of rods 262, thereby securing rods 262 to cross member 260. Rods 262 extend through the axis of rotation 238 of shaft 232 radially outwardly with respect thereto to other reduced and threaded end portions. Spring retainer 266 is mounted between rods 262 and is secured thereon by threaded engagement of nuts 268 with the end portions of rods 262.

Secondary weight member 270 is slidably supported on rods 262 of shaft 232. Weight member 270 is normally retained in the position shown in FIG. 13 by means of spring 272. Each spring 272 is concentrically arranged with one of the rods 262, and extends between spring retainer 266 and the secondary weight member 270. It will be understood that both the spring rate and the extent of preloading of springs 272 and 256 is a function of the desired operating characteristics of the variable amplitude vibratory apparatus 230.

The operation of vibratory apparatus 230 is as follows. Weight members 252 and 270 are normally retained in the positions shown in FIG. 13 so that vibratory apparatus 230 is initially balanced. Thus the wr factor is initially substantially zero and remains substantially zero as the rotational shaft velocity is increased to a first predetermined magnitude. At this first predetermined magnitude, primary weights 252 begin to pivot outwardly in the direction of arrows 274 in opposition to the torques exerted on shafts 246 by springs 256. As rotational shaft velocity is further increased, primary weights 252 finally attain the positions shown in dashed lines in FIGS. 13 and 14 which produce maximum amplitude in vibratory apparatus 230. As the rotational velocity of shaft 232 further increases to a second predetermined magnitude, secondary weight member 270 begins to move outwardly along rods 262 thus tending to counter-balance primary weights 252. As the rotational velocity of shaft 232 continues to increase to a predetermined magnitude, weight member 270 progresses outwardly on rods 262 until further movement thereof is prevented by stops 276 secured to rods 262. Thus, as the rotational shaft velocity of vibratory apparatus 230 is increased, the amplitude thereof is first increased from zero to a maximum value and then is decreased to a value below the maximum.

Figure 15:
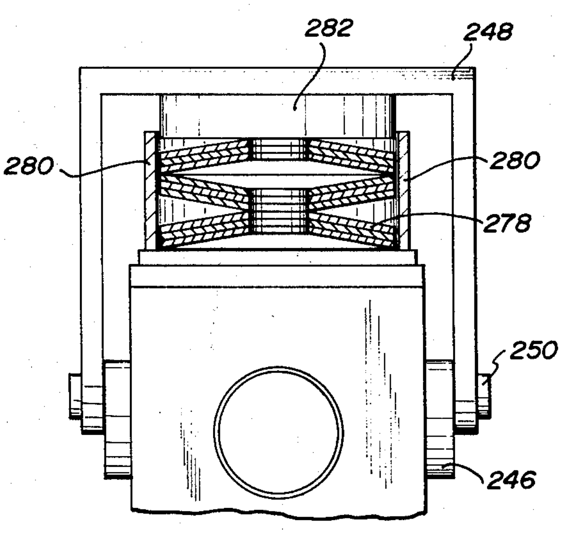
FIG. 15 is an enlarged partial end view showing a partial sectional view of a first modification of the embodiment of the invention shown in FIGS. 13 and 14.

Turning to FIG. 15, there is shown a first modification of the vibratory apparatus 230 shown in FIGS. 13 and 14. Instead of elastomeric springs 256, round disc springs 278 are used. The disc springs 278 are positioned within the circular enclosures 280 which is secured to the outer surface of cross plates 254, and beneath round portions 282 of yokes 248. At least two advantages are realized by the use of disc springs 280. First, owing to the reduced weight and mass of a disc spring, considerably less centrifugal force is developed thereby. Second, since the cumulative preloading a series of disc springs may be simply adjusted by adding or removing units thereof, operational scheduling of the variable amplitude vibratory apparatus 230 is thereby facilitated. Vibratory apparatus 230 utilizing disc springs 278 in all other respects functions as was hereinbefore described.

Figure 16:
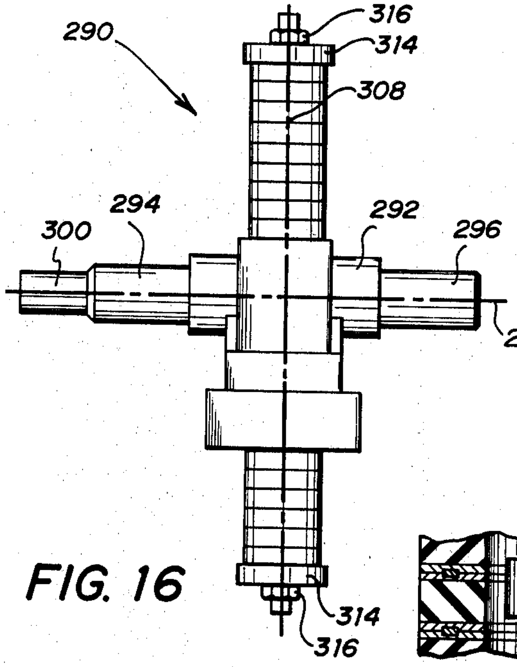
FIG. 16 is a side view of a variable amplitude vibratory apparatus incorporating a seventh embodiment of the invention.
Figure 18:
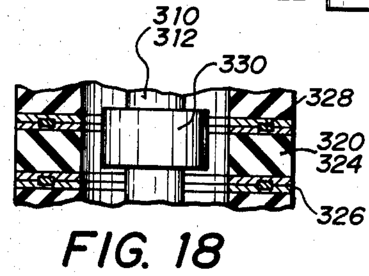
FIG. 18 is an enlarged cross sectional view of a portion of the embodiment of the invention shown in FIGS. 16 and 17.
Figure 17:
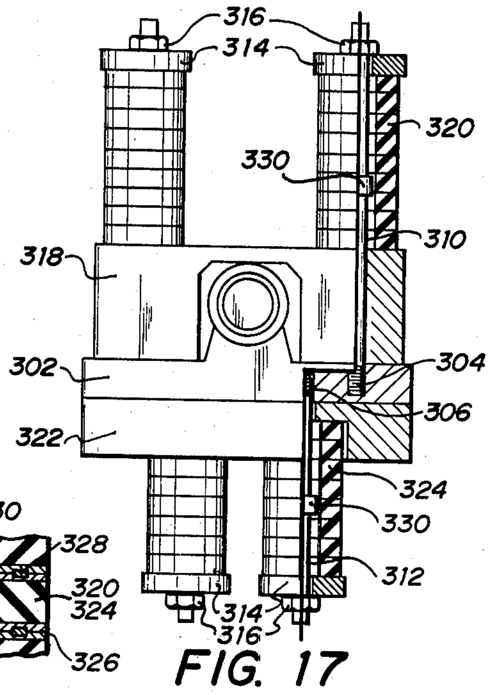
FIG. 17 is an end view of the embodiment of the invention shown in FIG. 16 in which certain parts have been broken away to more clearly illustrate certain features of the invention.

Referring now to FIGS. 16, 17 and 18, there is shown a variable amplitude vibratory apparatus 290 incorporating a seventh embodiment of the invention. The apparatus 290 comprises a shaft 292 having opposed bearing portions 294 and 296. The bearing portions 294 and 296 support the shaft 292 for rotation about an axis 298. Rotation of the shaft 292 is effected by means of structure 300 extending from the end thereof adjacent the bearing portion 294. The structure 300 may comprise an internal spline, an external spline, suitable gearing or other conventional structure.

A member 302 is secured to shaft 292, as for instance by welding, for rigid cooperation therewith to define the frame of shaft 292. Member 302 includes two pairs of drilled and tapped holes, one pair of holes 304 being located on opposite sides of shaft 292 in the upper surface of member 302, and the other pair of holes 306 being located on opposite sides of shaft 292 in the lower surface of member 302. Drilled and tapped holes 304 and 306 are symmetrical with respect to shaft 292, being located in a plane 308 which is perpendicular to the axis of rotation 298. Two pairs of rods 310 and 312 are each provided with a reduced and threaded end portions which threadedly engage tapped hole pairs 304 and 306 respectively, whereby rods 310 and 312 are secured to member 302. Each of the rods 310 and 312 extends outwardly from the axis of rotation 298 and coincidentally with plane 308 to a reduced and threaded end portion. Spring retainers 314 are mounted near the distal ends of rods 310 and 312, and are secured thereon by threaded engagement of nuts 316 with the outward reduced and threaded portion of each rod 310 or 312.

A generally U-shaped movable weight member 318 is slidably supported on rods 310 of the shaft 292. Movable weight member 318 is normally retained in the position illustrated in FIGS. 16 and 17 by means of a plurality of elastomeric springs 320. The springs 320 are arranged in stacks concentric with rods 310. Movable weight member 322 is similarly slidably supported on rods 312 on the opposite side of member 302. Movable weight member 322 is normally retained in the position illustrated in FIGS. 16 and 17 by means of a plurality of elastomeric springs 324. The springs 324 are arranged in stacks concentric with rods 312. The springs 320 and 324 extend between spring retainers 314 and movable weight members 318 and 322 respectively. As is best shown in FIG. 18, elastomeric springs 320 and 324 are bonded between circular plates 326. Adjacent plates 326 include machined circular grooves which receive a circular key 328 therein. By this means, centrifugal forces are distributed through the stacks of elastomeric springs 320 and 324 without uneven deformation thereof. In addition, a stop 330 is mounted on each of the rods 310 and 312 within surrounding springs 320 and 324 respectively. It will be understood that both the spring rate and the preloading of the springs 320 and 324 is a function of the desired operating characteristics of the variable amplitude vibratory apparatus 290.

During operation of the vibratory apparatus 290, movable weight members 318 and 322 are initially retained in the positions illustrated in FIGS. 16 and 17. Shaft 292 is nominally balanced and remains that way until the rotational velocity thereof reaches a first predetermined magnitude, at which point movable weight member 322 begins outward movement along rods 312. As the rotational shaft velocity further increases, weight member 322 becomes progressively eccentric against the resistance of springs 324 until eventually contacting stops 330. At this point the wr factor of the vibratory apparatus 290 is maximized. At a second, higher predetermined magnitude of rotational shaft velocity weight member 318 begins to move outwardly along rods 310 against the resistance of springs 320 thus tending to counterbalance the eccentricity of weight member 322. Further outward movement of the movable weight member 318 is eventually limited by engagement thereof with stops 330 on rods 310, whereupon the overall wr factor of the variable amplitude vibratory apparatus 290 is substantially reduced.

Figure 19:
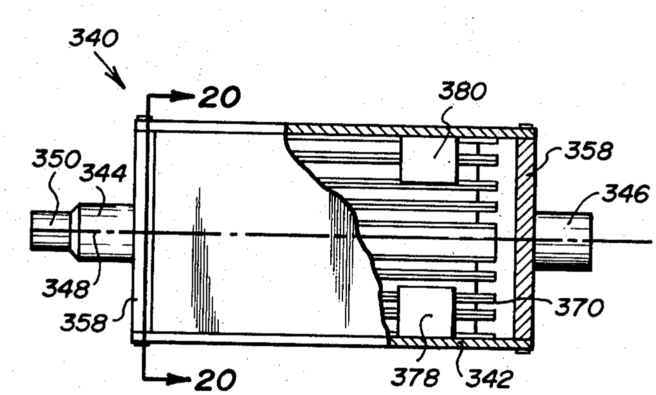
FIG. 19 is a side view of a variable amplitude vibratory apparatus incorporating an eighth embodiment of the invention in which certain parts have been broken away more clearly to illustrate certain features of the invention.
Figure 20:
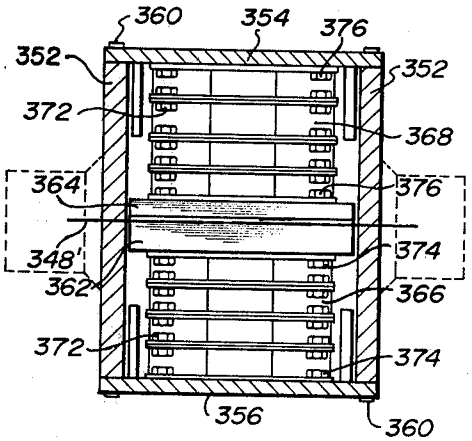
FIG. 20 is an enlarged sectional view taken generally along the line 20—20 of FIG. 19 in the direction of the arrows.

Referring to FIGS. 19 and 20, there is shown a variable amplitude vibratory apparatus 340 incorporating an eighth embodiment of the invention. The apparatus 340 comprises a shaft 342 which is adapted for use in a vibratory mechanism, such as a vibratory roller/compactor. The shaft 342 has a pair of opposed bearing portions 344 and 346 which define an axis of rotation 348. Rotation of the shaft 342 about the axis 348 is effected by means of structure 350 at the end thereof adjacent the bearing portion 344. The structure 350 may comprise an internal spline, an external spline, suitable gearing, or other conventional structure.

Referring to FIG. 20, the plane 348' shown therein is coincident with the axis of rotation 348 of the shaft 342. Shaft 342 comprises a pair of side plates 352 which may be, but is not necessarily symmetrical about the plane 348'. Top and bottom plates 354 and 356 are demountably secured to end plates 358 by means of fasteners 360. End plates 358 are secured in turn to side plates 352, as for instance by welding, whereby plates 352, 354, 356 and 358 cooperate to define the box frame of shaft 342.

Because of the rigid construction of shaft 342, it will be understood that opposed bearing portions 344 and 346 may be mounted on side plates 352 instead of end plates 358. The alternate placement of bearing portions 344 and 346 shown in phantom lines in FIG. 20 comprises a significant feature of vibratory apparatus 340. In this manner, the apparatus may be oriented to present a relatively shorter shaft length, thereby affording some design flexibility when confronted with spacial constraints of various vibratory systems.

Positioned inside the box frame of shaft 342 are rectangular movable weights 362 and 364. Movable weight members 362 and 364 are normally retained in mutual engagement as shown in FIGS. 19 and 20 by means of a plurality of elastomeric springs 266 and 368. Springs 366 are arranged in a stack between primary weight member 362 and bottom plate 356. Springs 368 are arranged in a stack between secondary weight member 364 and top plate 354. Each of the elastomeric springs 366 and 368 is bonded between metal plates 370 of slightly greater relative length so as to form a flange. Fasteners 372 connect adjacent plates 370 to form the two stacks of springs 366 and 368. Screws 374 in turn fasten the stack of springs 366 between primary weight member 362 and plate 356. Similarly, screws 376 fasten the stack of springs 368 between secondary weight member 364 and plate 354. It will be understood that both the spring rates and the preloading of the springs 366 and 368 are a function of the desired operating characteristics of the variable amplitude vibratory apparatus 340.

The operation of vibratory apparatus 340 proceeds as follows. Movable weight members 362 and 364 are initially retained in the positions shown in FIGS. 19 and 20, whereby shaft 342 is balanced. Shaft 342 remains balanced as the rotational velocity thereof increases, until the retaining force of springs 366 is overcome by the centrifugal force of weight member 362. At this first predetermined rotational velocity, weight member 362 separates from weight member 364 and begins to move outwardly. As the rotational shaft velocity further increases, primary weight member 362 is eventually halted by stops 378, whereby maximum vibrational amplitude is achieved. At a second, higher predetermined rotational shaft velocity, secondary weight member 364 begins outward movement which tends to counterbalance shaft 342. Further outward movement of the secondary weight member 364 is finally limited by engagement thereof with stops 380, whereupon the wr factor of the variable amplitude vibratory apparatus 340 is substantially reduced.

Figure 21:
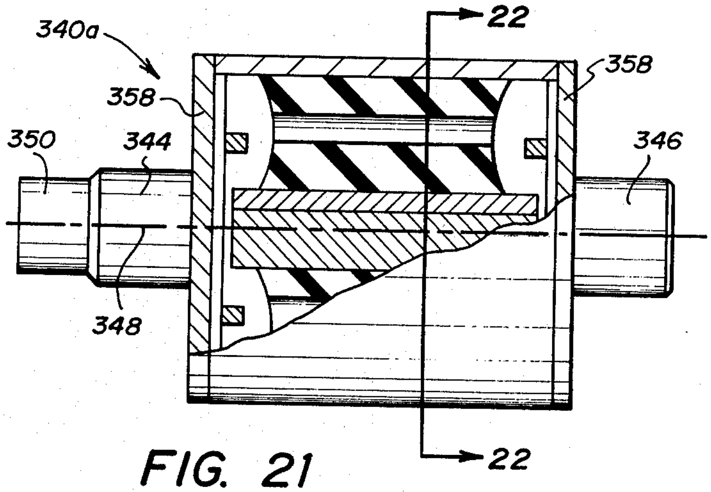
FIG. 21 is a side view of a first modification of the inventive embodiment shown in FIGS. 19 and 20 in which certain parts have been broken away more clearly to illustrate certain features of the invention.
Figure 22:
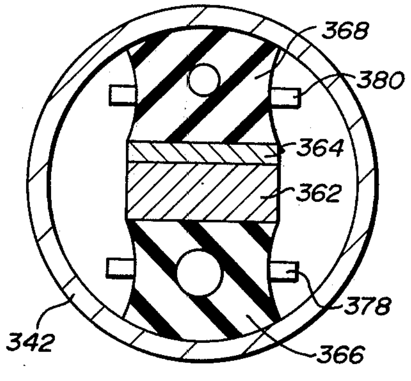
FIG. 22 is a sectional view taken generally along the line 22—22 of FIG. 21 in the direction of the arrows.

Turning to FIGS. 21 and 22, there is shown a first modification of the vibratory apparatus 340 shown in FIGS. 19 and 20. Instead of a box-like frame, the shaft 342 of vibratory apparatus **340*a* comprises a cylindrical housing. Rectangular movable weight members 362 and 364 are positioned inside the frame of shaft 342 and are normally retained in mutual engagement by means of elastomeric springs 366 and 368. Each elastomeric spring 366 and 368 is of one piece construction, and is bonded directly between the frame of shaft 342 and movable weight member 362 or 364 respectively. Stops 378 and 380 are secured to the inside of end plates 358 to limit outward displacement of weight members 362 and 364. In addition, guides (not shown) may be used to keep the weight members 362 and 364 square during outward movement thereof. Vibratory apparatus 340***a* in all other respects functions as was hereinbefore described with regard to vibratory apparatus 340.

Figure 23:
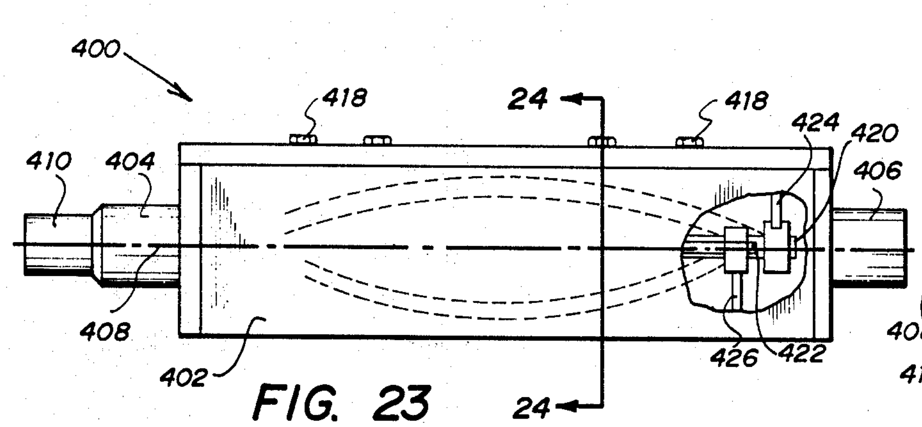
FIG. 23 is a side view of a variable amplitude vibratory apparatus incorporating a ninth embodiment of the invention in which certain parts have been broken away more clearly to illustrate certain features of the invention.
Figure 24:
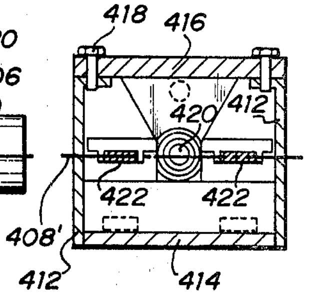
FIG. 24 is a sectional view taken generally along the line 24—24 of FIG. 23 in the direction of the arrows.

Having reference to FIGS. 23 and 24, there is shown a variable amplitude vibratory apparatus 400 incorporating a ninth embodiment of the invention. The apparatus 400 comprises a shaft 402 which is adapted for use in a vibratory mechanism, such as a vibratory roller/compactor. The shaft 402 has a pair of opposed bearing portions 404 and 406 which define an axis of rotation 408. Rotation of the shaft 402 about the axis 408 is effected by means of structure 410 at the end thereof adjacent the bearing portion 404. The structure 410 may comprise an internal spline, an external spline, suitable gearing, or other conventional structure.

Referring to FIG. 24, the plane 408' shown therein is coincident with the axis of rotation 408 of the shaft 402. Shaft 402 comprises a pair of side plates 412 which are symmetrical about the plane 408' and which are secured to base plate 414 as for instance by welding. Cover plate 416 is likewise symmetric to base plate 414 and is demountably secured to side plates 412 by means of fasteners 418. Accordingly, plates 412, 414 and 416 cooperate to define the box frame of shaft 402.

Positioned inside the box frame of shaft 402 are movable weight members 420 and 422. Movable weight members 420 and 422 are constructed of a resilient material, such as spring steel, plastic or rubber compounds, or other suitable material which is resistant to deformation. Accordingly, weight members 420 and 422 simultaneously serve dual functions, that of spring members as well as weight members. Consequently, weight members 420 and 422 normally occupy the nondeformed positions shown in full lines in FIGS. 23 and 24, which positions are slightly offset from the rotational axis 408. Shown in a circular solid configuration, the ends of weight member 420 are secured to self-aligning bearings (not shown) mounted in brackets 424. Brackets 424 in turn are attached to the inside surface of cover plate 416. Similarly offset and symmetrical about axis 408, weight members 422 are clamped loosely in brackets 426 so as to allow outward movement without binding. The brackets 426 are attached in turn to the inside surface of base plate 414. Thus, weight members 420 and 422 are connected with flexible joints (not shown) to brackets 424 and 426 respectively, so as to withstand repeated bending thereby resisting fatique which would cause early breakage. It will be understood that the specific materials selected and the specific dimensions of weight members 420 and 422 are a function of the desired operating characteristics of the variable amplitude vibratory apparatus 400.

During operation of the vibratory apparatus 400, weight members 420 and 422 are initially positioned as shown in full lines such that shaft 402 is balanced. Shaft 402 remains balanced until the rotational velocity thereof increases to a first predetermined magnitude, at which point weight members 422 commence outward deflection. As the rotational shaft velocity further increases, weight members 422 become progressively deformed as shown in dashed lines in FIGS. 23 and 24 until constrained by base plate 414. At this point the wr factor of the vibratory apparatus 400 is maximized, and held at a constant value until rotational shaft velocity increases to a second predetermined magnitude. At this point, weight member 420 begin outward deflection thus tending to counterbalance the eccentricity of weight members 422. Further deformation of weight member 420 is limited by engagement thereof with cover plate 416, whereupon the overall wr factor of the variable amplitude vibratory apparatus 400 is substantially reduced.

Figure 25:
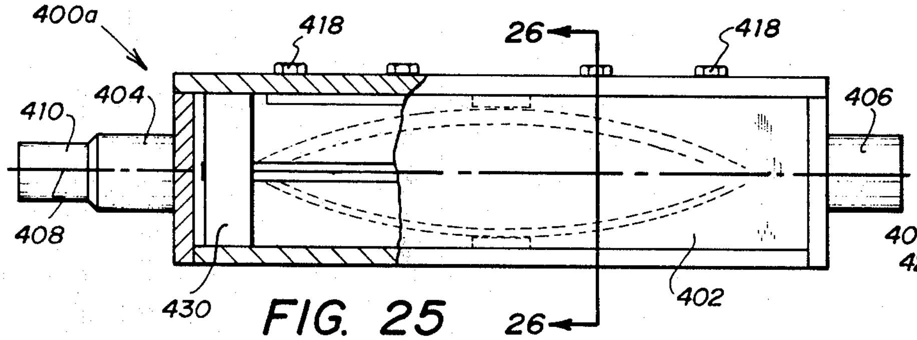
FIG. 25 is a side view of a first modification of the inventive embodiment shown in FIGS. 23 and 24 in which certain parts have been broken away more clearly to illustrate certain features of the invention.
Figure 26:
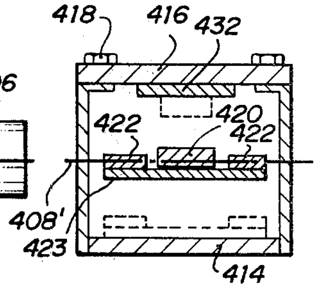
FIG. 26 is a sectional view taken generally along the line 26—26 of FIG. 25 in the direction of the arrows.

Turning to FIGS. 25 and 26, there is shown a first modification of the vibratory apparatus 400 shown in FIGS. 23 and 24. In vibratory apparatus 400*a*, the weight members 420 and 422 are mounted between a common pair of blocks 430, instead of separate pairs of brackets. Blocks 430 are secured at opposite ends within the frame of shaft 402, and are preferably constructed of a resilient material, such as a plastic or rubber compound having load carrying capability. If desired, weight members 420 and 422 may be potted within block 430, or connected thereto by other conventional means. In addition, weight members 422 are secured together at midlength by a cross member 423. Cross member 423 helps to control the outward movement of weight members 422 toward the position shown in dashed lines in FIG. 26 against the base plate 414, which direction of movement is opposite the outward movement of weight member 420. Spacer 432 may be attached to the inside of cover plate 416 to limit displacement of weight member 420, if desired. Vibratory apparatus 400*a* in all other respects functions as was hereinbefore described with regard to vibratory apparatus 400.

Figure 27:
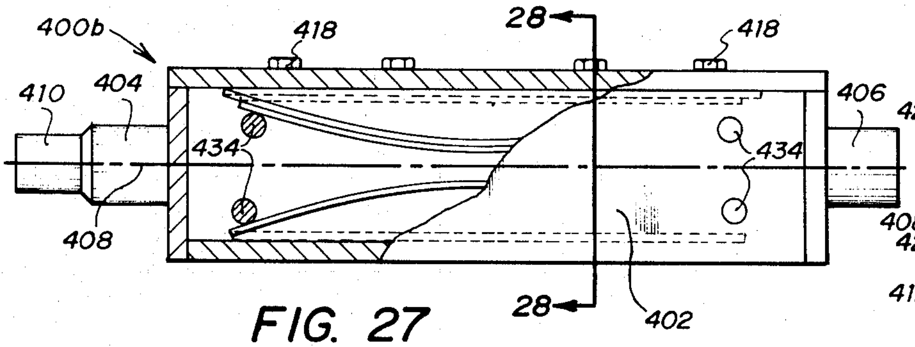
FIG. 27 is a side view of a second modification of the inventive embodiment shown in FIGS. 23 and 24 in which certain parts have been broken away more clearly to illustrate certain features of the invention.
Figure 28:
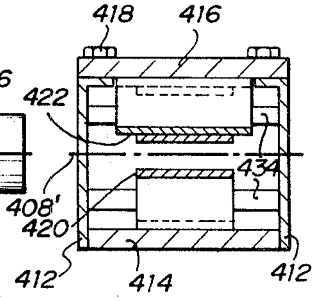
FIG. 28 is a sectional view taken generally along the line 28—28 of FIG. 27 in the direction of the arrows.

Now turning to FIGS. 27 and 28, there is shown a second modification of the vibratory apparatus 400 shown in FIGS. 23 and 24. Vibratory apparatus 400*b* features two semi-elliptical leaf springs as weight members 420 and 422. Supported within shaft 402 by cross rods 434 extending between side plates 412. In this modification the leaf springs have a semi-elliptical form in the relaxed, initial state. Under the influence of centrifugal force, weight/spring members 420 and 422 assume a relatively straighter configuration. Accordingly, rotational shaft velocity causes weight/spring members 420 and 422 to flatten out toward the positions shown in dashed lines in FIG. 27. In all other respects, vibratory apparatus 400*b* functions as was hereinbefore described with regard to vibratory apparatus 400.

From the foregoing it will be understood that the present invention comprises a variable amplitude vibratory apparatus incorporating numerous advantages over the prior art. Perhaps the most important advantage deriving from the use of the invention involves the fact that the wr factor of a rotational type vibratory apparatus may be selectively controlled in accordance with the rotational velocity of the apparatus. Another important advantage deriving from the use of the invention involves the fact that the wr factor of a rotational type vibratory apparatus may be rendered constant over a substantial range of rotational velocities, and yet may be selectively varied in accordance with changes in rotational velocity. Other advantages deriving from the use of the invention will readily suggest themselves to those skilled in the art.

Although preferred embodiments of the invention and a limited number of modifications thereof have been illustrated in the accompanying drawings and described in the foregoing detailed description, it will be understood that the invention is not limited to the embodiments shown and described, but is capable of numerous rearrangements, modifications and substitutions of parts and types of elements without departing from the spirit and scope of the invention.

What is claimed is:

1. A variable amplitude vibratory apparatus comprising:

shaft means supported for rotation about an axis;

first movable weight means mounted eccentricaly on the shaft means for rotation therewith for movement between a first relatively reduced eccentricity position and a first relatively increased eccentricity position with respect to the axis of rotation in response to a centrifugal force of rotation;

first guiding means attached to said shaft means for guiding the first movable weight means for movement between the first reduced eccentricity position and the first increased eccentricity position with respect to the axis of rotation wherein the guiding means for the first movable weight means includes first rod means mounted on the shaft means and extending outwardly substantially perpendicularly with the axis of rotation of the shaft means and slidably supporting the first movable weight means;

first stop means mounted on the first rod means for limiting maximum eccentricity of the first movable weight means;

first spring means connected between said first movable weight means and first guiding means, and biasing the first movable weight means toward the first relatively reduced eccentricity position for retaining the first movable weight means in the first reduced eccentricity position until the rotational shaft velocity increases above a first predetermined magnitude and for yieldably resisting progressive movement of the first movable weight means as said first movable weight means moves toward the first increased eccentricity position in response to increasing centrifugal force as rotational shaft velocity increases above the first predetermined magnitude wherein the first spring means includes at least one compression spring means mounted concentrically on the first rod means;

second movable weight means mounted eccentrically on the shaft means for rotation therewith for counterbalancing the first movable weight means and for movement between a second relatively reduced eccentricity position and a second relatively increased eccentricity position with respect to the axis of rotation wherein the second movable weight means comprises two weight members which are guided and supported for pivotal movement about two spaced axes which are substantially perpendicular to the rotational axis of the shaft means; p1 the center of mass of the second movable weight means being positioned on the opposite side of the shaft means from the center of mass of the first movable weight means;

second guiding means attached to said shaft means for guiding the second movable weight means for movement between the second reduced eccentricity position and the second increased eccentricity position with respect to the axis of rotation; and second spring means connected between said second movable weight means and second guiding means, and biasing the second movable weight means toward the second reduced eccentricity position for retaining the second movable weight means in the second reduced eccentricity position until the shaft rotational velocity increases to a second higher predetermined magnitude and for yieldably resisting progressive movement of the second movable weight means as said second movable weight means moves toward the second increased eccentricity position in response to increasing centrifugal force so that the second movable weight increasingly counterbalances the first movable weight as the rotational shaft velocity increases above the second higher magnitude.

2. The balanced variable amplitude vibratory apparatus according to claim 1 wherein the second spring means comprises elastomeric spring means mounted on the shaft means and biasing the second weight means for pivotal movement in a predetermined direction with respect to the axis of pivotal movement.

* * * * *